United States Patent
Fellhauer

(10) Patent No.: US 12,425,071 B2
(45) Date of Patent: Sep. 23, 2025

(54) METHOD, CIRCUIT ARRANGEMENT, AND SYSTEM FOR IDENTIFYING IMPEDANCE CHANGES IN A SIGNAL LINE

(71) Applicant: Robert Bosch GmbH, Stuttgart (DE)

(72) Inventor: Felix Fellhauer, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 77 days.

(21) Appl. No.: 18/555,762

(22) PCT Filed: Jul. 7, 2022

(86) PCT No.: PCT/EP2022/068874
§ 371 (c)(1),
(2) Date: Oct. 17, 2023

(87) PCT Pub. No.: WO2023/001575
PCT Pub. Date: Jan. 26, 2023

(65) Prior Publication Data
US 2024/0214030 A1    Jun. 27, 2024

(30) Foreign Application Priority Data
Jul. 19, 2021 (DE) ............. 10 2021 207 683.1

(51) Int. Cl.
*H04B 3/462* (2015.01)
*H04B 3/48* (2015.01)

(52) U.S. Cl.
CPC ............... *H04B 3/462* (2013.01); *H04B 3/48* (2013.01)

(58) Field of Classification Search
CPC .......... H04B 3/462; H04B 3/466; H04B 3/48; H04B 3/46; H04B 3/30; H04B 3/32; H04B 3/34; H04B 3/50; H04B 17/00
See application file for complete search history.

(56) References Cited

U.S. PATENT DOCUMENTS

| | | | |
|---|---|---|---|
| 5,633,801 A | 5/1997 | Bottman | |
| 6,177,801 B1 * | 1/2001 | Chong | H04M 3/306 324/520 |
| 7,362,850 B2 * | 4/2008 | Jensen | H04M 3/306 379/1.01 |
| 2007/0014393 A1 * | 1/2007 | Jensen | H04B 3/46 379/30 |
| 2012/0187905 A1 * | 7/2012 | Kanayama | B60L 53/68 320/109 |

(Continued)

OTHER PUBLICATIONS

International Search Report for PCT/EP2022/068874, Issued Oct. 10, 2022.

(Continued)

*Primary Examiner* — Khanh C Tran
(74) *Attorney, Agent, or Firm* — NORTON ROSE FULBRIGHT US LLP

(57) ABSTRACT

A method and to a circuit arrangement for identifying impedance changes in a signal line in a communication system. A first signal at a first frequency is input at a first end of the signal line, wherein a signal coming from the signal line and present at the first end is detected, is sampled at a second frequency different from the first frequency, and is analyzed for an impedance change. The state of the signal line is deduced on the basis of the analyzed signal.

14 Claims, 5 Drawing Sheets

(56) References Cited

U.S. PATENT DOCUMENTS

2019/0302159 A1* 10/2019 Lippert ..................... H01P 1/24
2024/0418757 A1* 12/2024 Olejiniczak .......... G01R 15/002

OTHER PUBLICATIONS

Trebbels et al., "Miniaturized FPGA-Based High-Resolution Time-Domain Reflectometer," IEEE Transactions On Instrumentation and Measurement, IEEE, vol. 62, No. 7, 2013, pp. 2101-2113. <https://sci-hub.ru/10.1109/tim.2013.2245190> Downloaded Oct. 16, 2023.

* cited by examiner

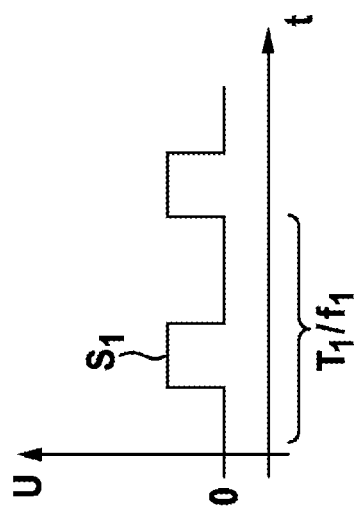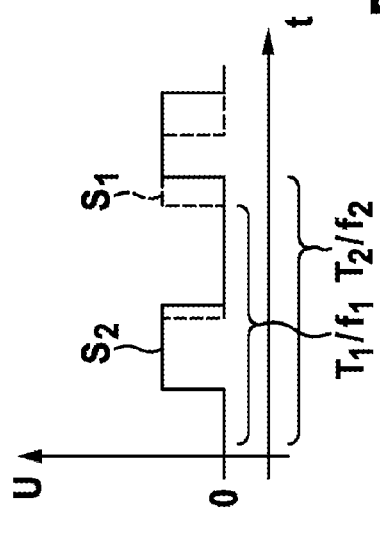
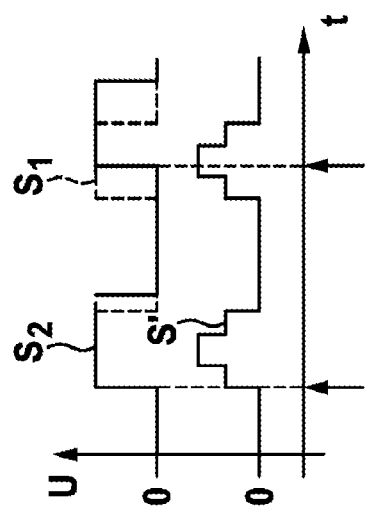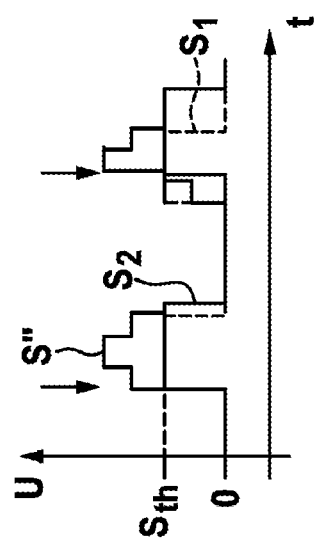
Fig. 6
Fig. 7

METHOD, CIRCUIT ARRANGEMENT, AND SYSTEM FOR IDENTIFYING IMPEDANCE CHANGES IN A SIGNAL LINE

FIELD

The present invention relates to a method, a circuit arrangement and a system for identifying impedance changes in a signal line in a communication system, and to a computing unit and a computer program for the implementation thereof.

BACKGROUND INFORMATION

In vehicles or their communication systems, computing tasks such as high-performance computing for automated driving are becoming increasingly centralized. This requires a reliable and fast communication infrastructure.

SUMMARY

The present invention provides a method, a circuit arrangement, and a system for identifying impedance changes in a signal line in a communication system, in particular a vehicle communication system, as well as a computing unit and a computer program for the implementation thereof. Advantageous example embodiments of the present invention are disclosed herein.

The present invention is concerned with the identification of impedance changes (in particular also whether an impedance change is present at all, or one or more thereof, and thus also monitoring) and the analysis of signal lines such as Ethernet, in particular automotive Ethernet, telecommunications lines, lines of (television) cable networks, or measurement lines which are laid, for example, only for the purpose of measurement (in this case lines can be used with an impedance particularly dependent on the environment). The network infrastructure in particular in vehicle communication is usually organized hierarchically, wherein data or messages are aggregated from a lower hierarchical level, in which sensors and actuators are arranged, and are guided via one or more intermediate levels, for example via a high-rate backbone, ultimately to a high-performance vehicle computer (also referred to as a vehicle central computer). This backbone network is generally a critical part of the entire communication infrastructure, since in the event of a fault a plurality of sensors and/or actuators can be disconnected from the vehicle central computer. Implementations can be used in which so-called "Automotive Ethernet" (AE) is used as a network technology on the physical layer. In order to improve reliability and safety, it is of interest to monitor, identify, and possibly even predict the state of these backbone connections in order to identify failures as early as possible and to prevent them where possible.

Typical applications in which the present invention can be used are so-called AE links, i.e., connections between two devices such as control units that are connected to one another in a data-transmitting manner via AE. In the two devices, control units or other computing units typically involved in an AE link, the physical layer modules (so-called PHYs, which are corresponding (usually integrated) circuits that convert purely digital information to the signals adapted to the physical medium) of the corresponding communication protocol are implemented, which allows the signals to be transmitted and received on the signal line. The first device typically functions as a master, the second as a slave. The entire system is generally designed as a so-called full-duplex system (FD system), which makes it possible for both devices to function simultaneously as a transmitter (TX) and a receiver (RX). A device (or the physical layer module therein) acting in master mode sends its messages (information units) to the signal line at a specific clock rate (so-called "symbol rate" $R_s$), which is derived from an internal clock source. The slave device reconstructs this clock rate on the basis of the received messages. The reconstructed clock signal is then used on the slave side to receive and transmit further messages.

A typical link between two control units in, for example, a vehicle is realized, for example, with AE on the physical layer module (layer 1 or PHY layer, according to OSI/ISO layer model), i.e., a corresponding circuit. Corresponding circuits are used as transmitters (TX) and receivers (RX) on both sides of a signal line in order to modulate and demodulate the signals on both sides. The communication channel (also referred to as connection segment) or signal line used is generally a single twisted copper cable pair (STP) or a coaxial cable with corresponding plugs. Due to aging, mechanical loading or loosening of plugs, a signal line or the connection segment can change or even fail.

In order to identify such a fault, so-called time domain reflectometry (TDR) can be used, for example. This comprises a specific mode, which can be implemented in one of the physical layer modules used. The corresponding physical layer module or the corresponding circuit can be configured in a dedicated diagnostic mode, which does not allow signals to be transmitted and received simultaneously. Instead of transmitting data, the physical layer module emits a dedicated test signal (with a specific waveform, for example), typically a step function or a Dirac delta function in the time domain. This transmitted test signal runs along the signal line and is subject to changes in the characteristic impedance of the signal line depending on the position in the signal line. Any local change in the impedance causes the propagating signal to be at least partially reflected and, as a result thereof, to return backward in the signal line to the transmitter. The reflections can then be received on the physical layer module or in the circuit, for example with a chain of units (signal processing chain, optionally with a plurality of readout units) that in normal operation is used to receive message signals that are sent by another device.

Taking into account the delay time and the corresponding shape (amplitude) of the reflected signal, information about the spatial and electrical properties of each impedance change of the signal line can be obtained, which information in turn allows mechanical damage or a degradation of the signal line to be identified. The spatial resolution of the entire system is determined here by the rise rate (edge steepness) of the transmitted test signal, as well as the sampling rate of the analog-to-digital converter (ADC) or other readout unit used for reception. The accuracy of the information obtained about the electrical properties (change in impedance) at the location of the reflection is limited by the digital resolution of the readout unit used (typically an ADC). In typical devices or control units for communication systems, both parameters (rise rate and sampling rate) are therefore usually kept as high as necessary and as low as possible. The achievable accuracy of TDR measurements, as explained above, is therefore limited in such systems.

Against this background, within the scope of the present invention, a method and a circuit arrangement are provided to significantly increase the accuracy of TDR measurements or generally of measurements of the impedance in such signal lines. According to an example embodiment of the present invention, a first signal at a first frequency ($f_1$) is input at a first end of the signal line. A signal generation unit such as a DAC (digital-to-analog converter), possibly with further components, can be used for this. In addition, a signal coming from the signal line and present at the first end is detected (in principle as before in TDR). The incoming signal is, for example, a signal reflected at an impedance change of the signal line. However, this signal is now sampled at a second frequency different from the first different frequency and then analyzed. A readout unit such as an ADC (analog-to-digital converter), possibly with further components, can be used for this. The state of the signal line is then deduced on the basis of the analyzed signal. Here, for example, the amplitude or the edge steepness can be analyzed in order to deduce the level of the impedance change in particular over time and/or space.

Preferably, according to an example embodiment of the present invention, the signal coming from the signal line and present at the first end is analyzed in steps or stages. For example, a curve over time of a voltage on the signal line can be determined first, and then an impedance curve can be determined or reconstructed therefrom. A location of a defect in the signal line can in turn be determined from the impedance curve. In addition, a characteristic ("fingerprint") of the signal line can be determined from the impedance curve. A measured value can also be determined from the impedance curve. Furthermore, a signal transit time can be reconstructed from the curve over time of the voltage.

The second frequency ($f_2$) is preferably only slightly lower or higher than the first frequency. In the case of a typically periodic first signal, the sampling time point (which is determined by the second frequency) is thus always shifted somewhat further within the period from period to period. A significantly better resolution is obtained in this way. While a resolution of e.g. f is specified by the sampling frequency of an ADC for conventional TDR, the proposed approach allows an effective resolution of $f_{\it eff}=((f_1)^{-1}-(f_2)^{-1})^{-1}=(f_1 \cdot f_2)/\Delta f$ to be obtained (where $\Delta f=f_2-f_1$). Since $\Delta f$ (the frequency offset, negative or also positive) is usually very small (in terms of absolute value) relative to $f_1$, i.e., $\Delta f \ll f_1$, it is correspondingly the case that $f_{\it eff} \gg f_1$.

There are two preferred variants for the conversion. According to an example embodiment of the present invention, a second signal at the second frequency can be generated at the first end of the signal line and then used as an activation of the sampling of the first signal at the first frequency. For this purpose, in particular a second signal generation unit, for example a second DAC, can be arranged or provided at the first end of the signal line, said second signal generation unit being configured to generate a second signal at the second frequency and to apply it to the readout unit (ADC). This second signal generation unit can be integrated into the circuit or the physical layer with the (first) signal generation unit and the readout unit (which are present in conventional control units or their physical layer modules anyway), but it is also possible for a separate circuit to be provided for this purpose, which is then provided in the sense of a system-on-chip (SoC). This variant (in both embodiments) can also be referred to as an integrated variant, since a corresponding circuit arrangement is necessary only on one side or at one end of the signal line.

However, according to an example embodiment of the present invention, it is also possible in the sense of a distributed variant to input a second signal at the second frequency at a second end of the signal line. For this purpose, in particular a signal coming from the signal line and present at the second end is detected at the first frequency, and on the basis of this the second signal is generated at the second frequency, in particular by adding (or subtracting) a constant frequency offset, and is input at the second end of the signal line. The corresponding circuit arrangement (at the first end of the signal line) is then in particular configured to detect a signal at the second frequency coming from the signal line and present at the connected first end and to supply it to the first readout unit.

In addition, according to an example embodiment of the present invention, a further circuit arrangement is provided which is to be connected at the second end of the signal line. This then has a second readout unit (for example likewise a DAC) which is configured to detect and to determine the frequency of a signal coming from the signal line and present at a connected second end. The incoming signal is basically the first signal, which can however be changed, e.g. attenuated, as a result of any impedance changes of the signal line, but the frequency corresponds to the first frequency. In addition, a second signal generation unit (an ADC, for example) is then provided there, which is configured to generate a second signal at the second frequency and to input it at the connected second end of the signal line. For this purpose, as mentioned, a corresponding frequency offset can be added to the frequency of the incoming signal. Both circuit arrangements together can then be considered a system.

In this case, the signal coming from the signal line and present at the first end is a superposition of a reflection of the first signal on the second signal. Preferably, only a signal component of the signal coming from the signal line and present at the first end is then used, said signal component being above a specified threshold value, for example the maximum amplitude of the first signal. It can thus be ensured that only components of the second signal are used for triggering the (first) readout unit, and only the reflection of the first signal (apart from a constant offset, caused by the trigger signal) is detected.

An advantage of these variants is that no additional units such as a further DAC (signal generation unit) have to be provided, but rather units included in the other device or physical layer module that is present anyway can be used. In this case, it is expedient to evaluate the signal for monitoring in the device used as master, the second signal at the second frequency is then input by the slave. In this variant, however, no interruptions of the signal line can be identified.

However, the physical layer modules (circuits) at both ends of the signal line can be used to achieve the functionality of a high resolution in the time domain without drastically increasing the complexity of the circuits used. The present invention thus makes it possible to increase the accuracy of monitoring systems for communication lines. In contrast to existing solutions, it is possible to identify not only dangerous defects on the signal line but also slight changes in the signal line properties. Predictive maintenance can thus be implemented and failures can be avoided even before the functionality of the system is affected.

A computing unit according to the present invention or a computing unit network (in the case of the distributed variant), for example of one or more control units of a motor vehicle, has a circuit arrangement according to the present invention or a system and is configured, in particular in terms of programming, to carry out a method according to the present invention.

Furthermore, the implementation of a method according to the present invention in the form of a computer program or computer program product with program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, DVDs, and others. It is also possible to download a program via computer networks (Internet, Intranet, etc.). Such a download can be wired or wireless (e.g. via a WLAN network or a 3G, 4G, 5G or 6G connection, etc.).

Further advantages and embodiments of the present invention are disclosed herein.

The present invention is illustrated schematically in the figures on the basis of exemplary embodiments and is described below with reference to the figures.

BRIEF DESCRIPTION OF THE DRAWINGS

FIGS. 6 and 7 schematically show signal curves for explaining the present invention.

DETAILED DESCRIPTION OF EXAMPLE EMBODIMENTS

Figure 1:
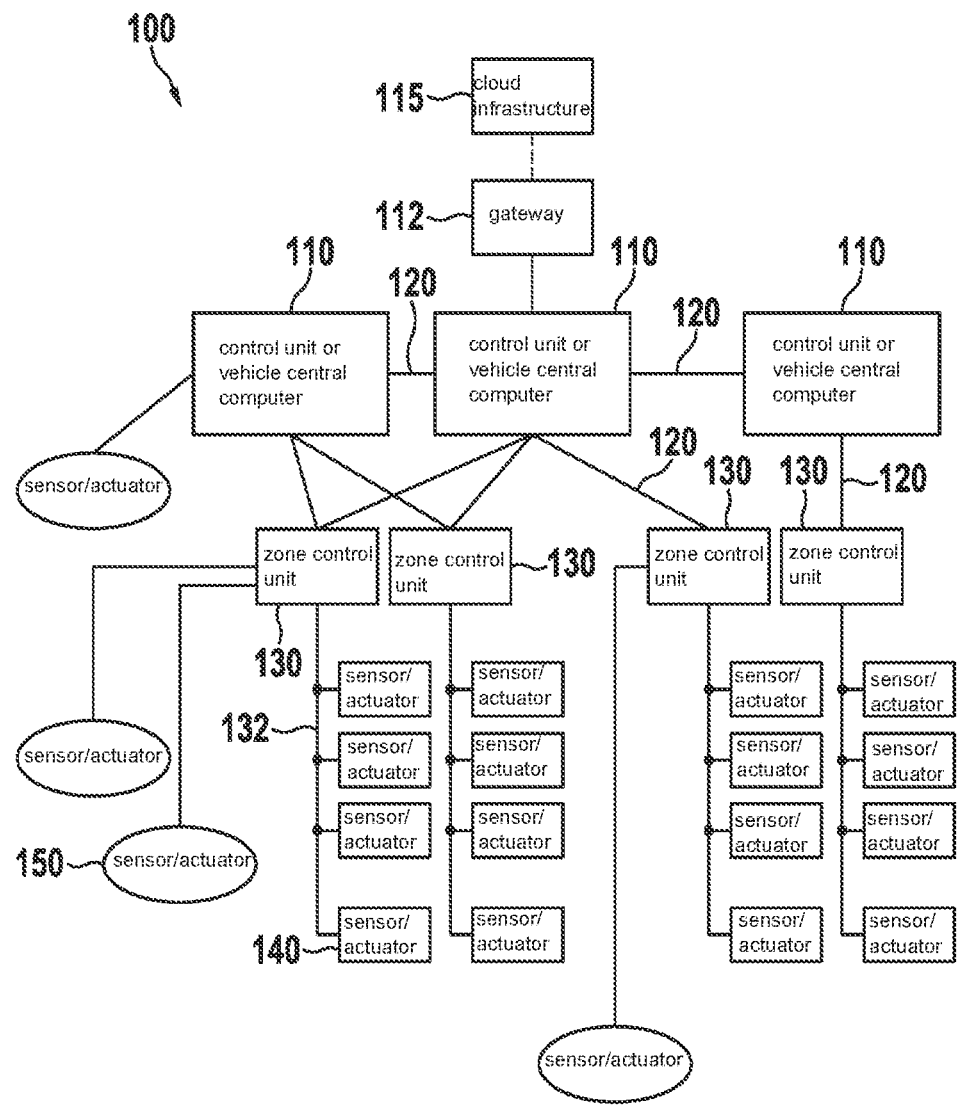
FIG. 1 schematically shows a communication system in which the present invention can be used.

FIG. 1 schematically shows a communication system 100 designed as a vehicle communication system, in which the present invention can be used. The vehicle communication system 100 has, by way of example, multiple control units, which are connected to one another and to zone control units 130 in a data-transmitting manner via respective automotive Ethernet signal lines 120. Different (simple) sensors and/or actuators 140 (rectangles) and (more powerful) sensors and/or actuators 150 (ellipses) can be connected to the zone control units 130, specifically via signal lines 132 designed as a CAN bus, for example.

These sensors and actuators form a lower or low hierarchy level in the network or vehicle communication system 100; the zone control units 110 form a higher intermediate level. Data from the sensors and/or actuators can be aggregated there and transmitted to the control units or vehicle central computers 110 (in an even higher level). It is also possible for (more powerful) sensors and/or actuators 150 to be connected directly to a control unit or vehicle central computer 110.

The control units or vehicle central computers 110 can in turn be connected, for example, via a gateway 112 to a cloud infrastructure 115, for example also via 5G or WiFi.

The specific design of the (vehicle) communication system 100 is not further relevant for the present invention; rather it is a matter of monitoring a signal line such as an automotive Ethernet signal line 120 between two control units or other computing units or devices in order to be able to identify any malfunctions in the communication system 100 as early as possible.

Figure 2:
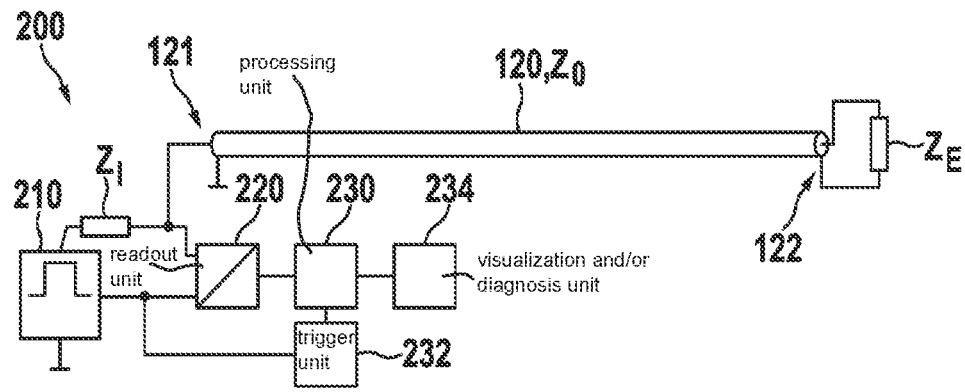
FIG. 2 schematically shows a non-inventive circuit arrangement.

FIG. 2 schematically shows a non-inventive circuit arrangement 200, which can be accommodated, for example, in one of the control units, within a physical layer module located therein, from FIG. 1. In addition, an automotive Ethernet signal line 120 (hereinafter referred to only as signal line) is shown, which is connected to the circuit arrangement 200 at a first end 121, has an impedance $Z_0$ and is terminated at a second end with an input impedance or end impedance $Z_E$ (depending on the direction from which the signal line is viewed).

An impedance $Z_1$ is provided at the first end 121, via which a signal generation unit 210, for example a DAC, can apply a signal to the signal line 120 or the first end 121 thereof and thus input the signal into the signal line. In addition, a readout unit 220, for example an ADC, is connected, with which a signal coming from the signal line 120 and present at the first end 121 (for example a reflected signal) can be detected and sampled. In addition, a processing unit 230, for example a microprocessor, and a visualization and/or diagnosis unit 234 are provided, by means of which it can be determined whether there is a defect in the signal line, for example.

In addition, a trigger unit 232 is provided, by means of which the sampling of the signal by the readout unit 220 can be started. The resolution is limited by the sampling frequency of the readout unit 220.

Figure 3:
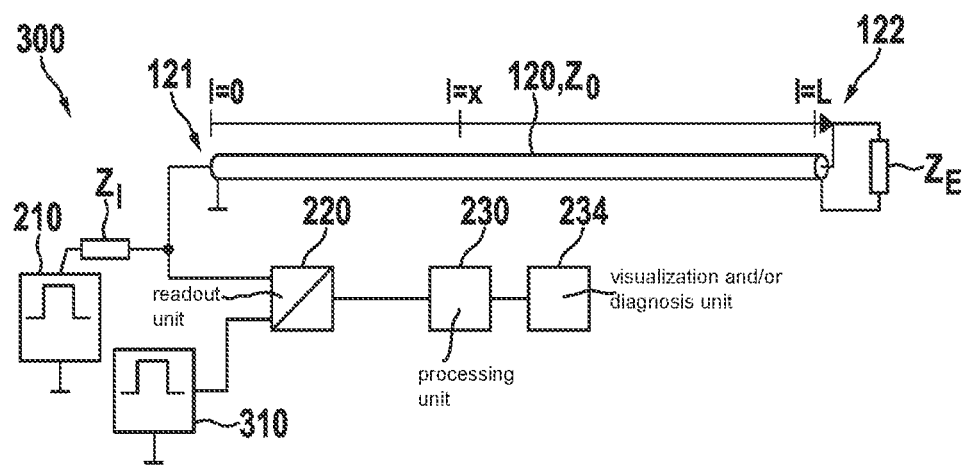
FIG. 3 schematically shows a circuit arrangement according to the present invention in a preferred embodiment.

FIG. 3 schematically shows a circuit arrangement 300 according to the present invention in a preferred embodiment. In contrast to the circuit arrangement 200, a second signal generation unit 310 is provided here, which serves as a trigger for the readout unit 220. The trigger unit 232 is no longer necessary. While the (first) signal generation unit 210 generates a first signal at a first frequency and inputs it into the signal line 120, the (second) signal generation unit 310 generates a second signal at a second frequency, which is somewhat lower than the first frequency, for example.

Any impedance changes along the signal line 120 between the beginning l=0 and the end l=L can thus be determined, for example including the location of the impedance change, as indicated with l=x. As in conventional TDR, the propagation speed can be used to calculate the location from the transit time. For a more detailed explanation of the evaluation at the second frequency, reference is made to the statements relating to FIGS. 6 and 7.

Figure 4:
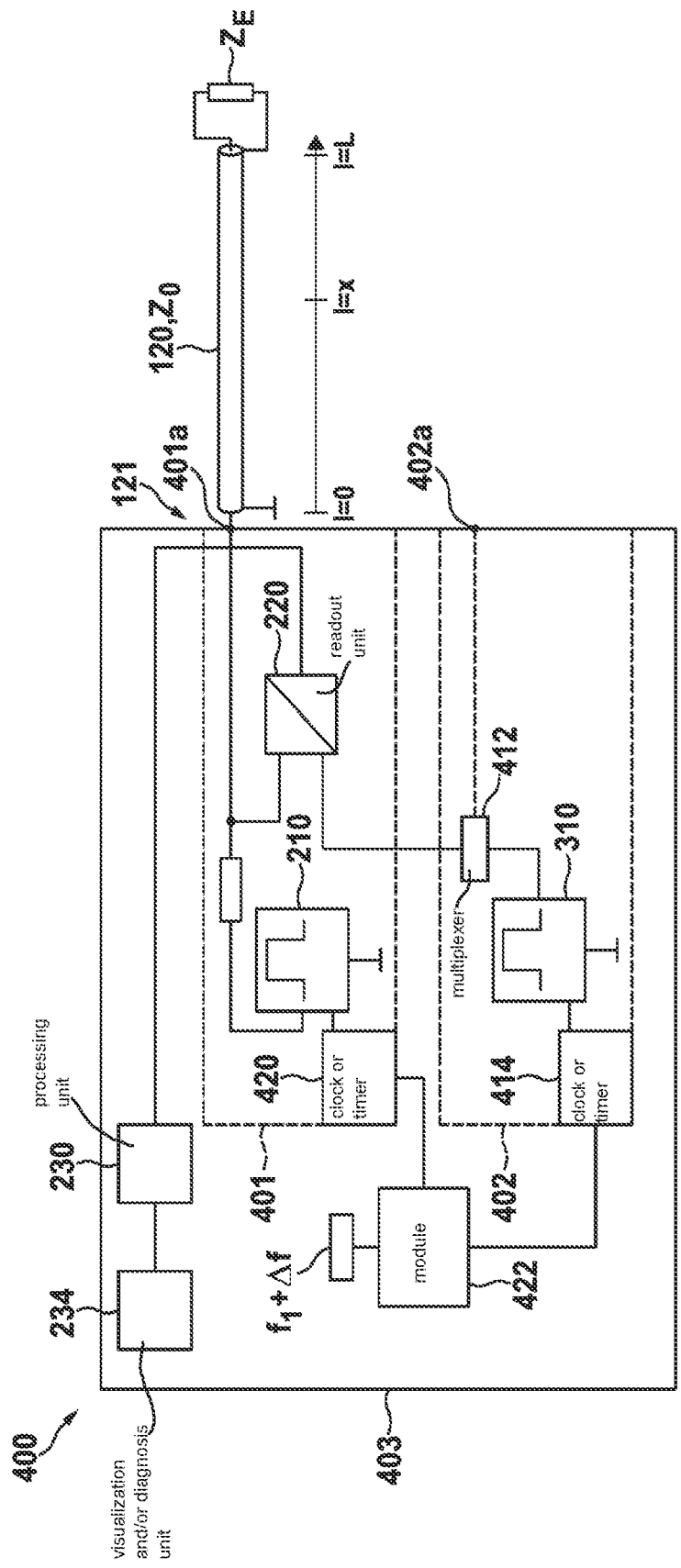
FIG. 4 schematically shows a circuit arrangement according to the present invention in a further preferred embodiment.

FIG. 4 schematically shows a circuit arrangement 400 according to the present invention in a further preferred embodiment. While the (first) signal generation unit 210 (for this purpose a clock or a timer 420 for generating the first frequency is indicated by way of example) and the readout unit 220 are part of a first circuit 401, the (second) signal generation unit 310 is provided in a separate circuit 402, wherein both circuits 401, 402 are provided on a common chip 403 and in each case implement individual communication ports 401a, 402a.

The (second) signal generation unit 310 is also assigned a clock or timer 414, which is synchronized with the clock 420 via a module 422 such that the (second) signal generation unit 310 reaches the second frequency $f_2=f_1+\Delta f$, while the (first) signal generation unit 210 has the first frequency $f_1$. The signal can then be forwarded from 402 to 401 via a multiplexer 412 for the purpose of measurement.

The circuit arrangements 300 and 400 are integrated embodiments, which can be provided, for example, in one of the control units from FIG. 1 and can also be executed there.

Figure 5:
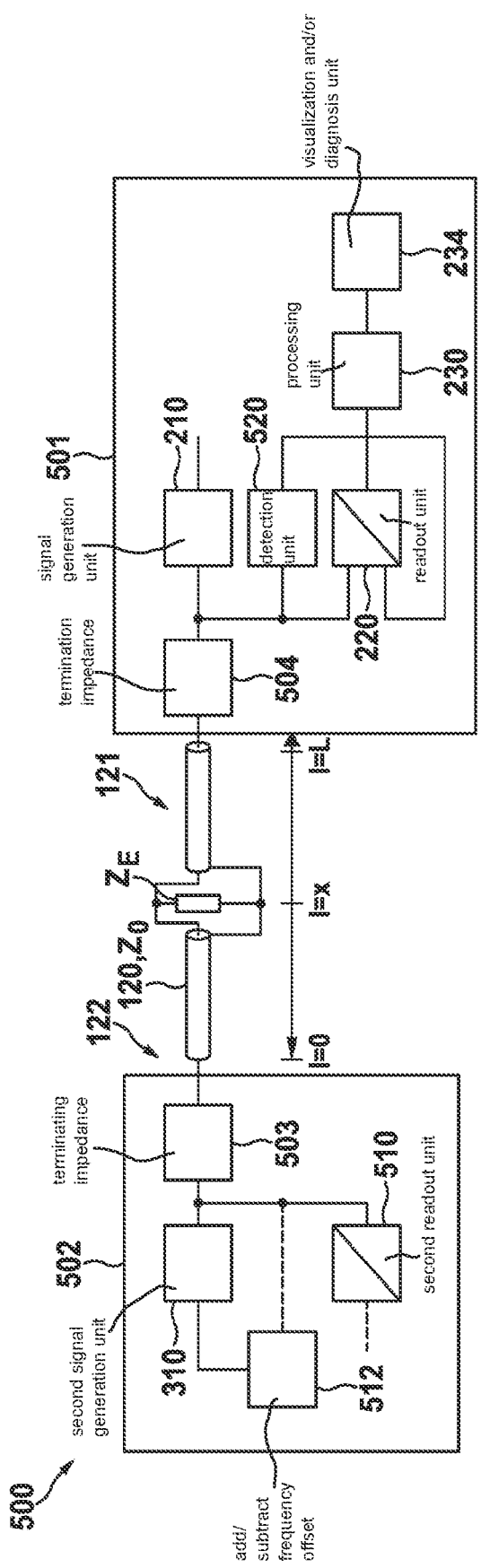
FIG. 5 schematically shows a system according to the present invention in a preferred embodiment.

FIG. 5 schematically shows a system 500 according to the present invention in a preferred embodiment. Here, a circuit arrangement 501 is provided at the first end 121 of the signal line 120 and basically comprises the functionalities of the circuit arrangement 300, apart from the second signal generation unit 310. Instead, this circuit assembly 501 is configured to detect a signal (which has a second frequency) coming from the signal line 120 and present at the connected first end 121 via a termination impedance 504 and to supply it to the first readout unit 220. For this purpose, a detection unit 520 is provided, which is configured to identify or detect such a second frequency from the (superposed) signal, for example by applying a threshold value of the height of the maximum amplitude of the first signal (cf. also FIG. 7 and associated statements).

A further circuit arrangement 502 is provided at the second end 122 of the signal line 120 and contains the second signal generation unit 310, which generates the second signal at the second frequency and inputs it into the signal line 120. For this purpose, however, a signal coming from the signal line 120 is first detected via a terminating impedance 503, namely by means of a second readout unit 510, for example an ADC. The frequency of the incoming signal, which is the possibly attenuated first signal at the first frequency, can thus be determined. A frequency offset can then be added (or subtracted) in a unit 512, so that the second frequency is obtained, at which the second signal generation unit 310 then inputs the second signal. In practice, this can be achieved, for example, with a PLL-like (PLL stands for "phase-locked loop") clock generation, which is synchronized on the input side to the reception frequency and regulates the output after a given, continuously increasing phase offset.

The system 500 with the circuit arrangements 501, 502 is a distributed embodiment, which can be provided, for example, in two of the control units connected via a signal line 120 from FIG. 1. In this case, the circuit arrangement 501 can be provided in a control unit used as a master, while the circuit arrangement 502 can be provided in a control unit used as a slave.

FIGS. 6 and 7 schematically show signal curves for explaining the present invention. For this purpose, a voltage U is plotted against time t in each case. In FIG. 6, the left-hand graph first shows the first signal $S_1$, which has a first frequency $f_1$ with corresponding period duration $T_1$. This first signal is input into the signal line at the first end.

The right-hand graph of FIG. 6 shows, in addition to the first signal $S_1$, a second signal $S_2$ at a second frequency $f_2$, which is lower than the first frequency $f_1$, and the corresponding period duration $T_2$. This can be seen by the longer period $T_2$. The second signal can be the signal that is input at the second end and detected at the first end and is then used as a trigger there. A case of an ideal signal line without any change in impedance is shown here. In principle, the second signal also corresponds to the signal for triggering (used in the integrated variant).

In FIG. 7, the left-hand graph again shows the two signals $S_1$ and $S_2$ as in the right-hand graph of FIG. 6. In addition, however, a signal S' is shown which corresponds to a signal that arises when the first signal $S_1$ is reflected at an impedance change in the signal line. For sampling, however, the second frequency of the second signal $S_2$ is used, so that in the second period of the signal S' a value that is slightly shifted backward within the period is detected, as indicated by arrows.

In this way, the generally periodic signal S' can be detected with a higher resolution, since period for period a somewhat later value within the period is detected. After all the values that correspond to a full period have been detected, one such period can be reconstructed. This allows a particularly accurate analysis of the signal with regard to any impedance changes in the signal line that cause only slight attenuation in the signal, for example.

The right-hand graph of FIG. 7 also shows, in addition to the signals $S_1$ and $S_2$, a signal S", which corresponds to a signal that arrives at the first end when the second signal is input at the second end. This means that the second signal, possibly in attenuated form, and the reflection of the first signal are superposed. In order now to obtain the second frequency that is to be used for triggering the readout unit despite this, a threshold value $S_{th}$ can be applied, which is at least equal to the maximum amplitude of the first signal. Only an amplitude of the detected signal that is greater than the maximum amplitude of the first signal is then used for triggering. This ensures that only the second frequency of the first signal, rather than the first frequency, is used as the trigger.

In addition to general monitoring, the present invention has further, special purposes. Predictive maintenance can thus be made possible. In particular for high-rate communication backbones in future vehicles, the "backbone" is an essential component of the communication system. In order to ensure functional reliability, it is particularly advantageous to monitor the state of the cable harness including cables, plugs, and soldering points on printed circuit boards (PCBs). The present invention can be used to identify degradation and even makes it possible to predict failures by continuous monitoring.

A cost-effective sensor exchange is made possible. The ability to measure and monitor the characteristic impedance of a signal line accurately can be used to either use the line itself as a sensor (certain environmental parameters can change the impedance of the line). Alternatively, passive sensors that change their impedance due to environmental influences (for example, humidity of the environment or proximity to other dielectric material) can be accommodated in the signal line.

Quality control of cable harnesses in the production process is made possible. In a production environment, the possibility of measuring the impedance over the entire length of a signal line, e.g. within a cable harness, can be used to identify faults or even smaller mechanical problems even during the assembly process. For example, a bending radius that is too small can be identified by the change in impedance of a cable.

The calibration of a wired termination is made possible. In a system in which at least one of the devices connected to a signal line can adjust its terminating impedance, the method can be used to fine-tune this termination in order to ensure impedance adjustment of the entire system.

In addition, monitoring of the network state is allowed. In a communication link or a bus system, any mechanical intervention in the system can affect the impedance of the wire line. This can be used to monitor and identify changes to the signal lines. The presence of an undesired device (e.g., an attacker) can be identified if the impedance curve of the originally constructed system is known.

As already mentioned, in a wired bus system, every branch and node causes impedance changes in the wired line. An accurate measurement of the impedance curve of such a system can enable the relevant network topology to be reconstructed.

Interception identification is also possible. Changes in the characteristic impedance of a wired connection (signal line) between two units or devices can be the result of an interception attack on the line. Even if the interceptor attempts to adjust its input impedance as closely as possible to the specification (in order to remain inconspicuous), the proposed method can be used to identify even small changes and thus the potential presence of an interceptor.

The method presented also allows the length of the wire line (and thus the transit time of signals via the wire line) to be measured very accurately, since the time resolution can be drastically increased. By monitoring the measured transit time between two devices, even the smallest changes in this transit time can be interpreted as the potential presence of a "man in the middle" attempting to intercept and possibly modify the communication.

Furthermore, the precise measurement of the signal transit time can be used, for example, to increase the accuracy of the time synchronization between two Ethernet nodes. Typically, the transit time between two physical layer modules is ascertained by the transmission of a data packet. However, the time resolution can only be in the same order of magnitude as the resolution of the receiver ADC determined by the data rate used. With the proposed approach, a transit time measurement with a time resolution far above those of current systems can be implemented.

The invention claimed is:

1. A method for identifying impedance changes in a signal line in a communication system, comprising the following steps:
    inputting a first signal at a first frequency at a first end of the signal line;
    detecting a signal coming from the signal line and present at the first end, sampling the signal at a second frequency different from the first frequency, and analysing the sampled signal for an impedance change; and
    deducing a state of the signal line based on the analyzed signal.

2. The method according to claim 1, wherein a second signal at the second frequency is generated at the first end of the signal line and is used to control the sampling at the second frequency.

3. The method according to claim 1, wherein a second signal at the second frequency is input at a second end of the signal line.

4. The method according to claim 3, wherein a signal coming from the signal line and present at the second end is detected at the first frequency, and wherein based on the signal present at the second end, the second signal generated at the second frequency is generated by by adding a constant frequency offset, and the second signal is input at the second end of the signal line.

5. The method according to claim 3, wherein only a signal component of the signal coming from the signal line and present at the first end is used to control the sampling at the second frequency, the signal component being above a specified threshold value which is a maximum amplitude of the first signal.

6. The method according to claim 1, wherein the signal coming from the signal line and present at the first end is analyzed in steps.

7. The method according to claim 1, wherein an automotive Ethernet line, or a telecommunications line, or a line of a cable network, or a measurement line is used as the signal line.

8. A circuit arrangement configured to identify an impedance change in a signal line in a communication system, comprising:
    a first signal generation unit configured to input a first signal at a first frequency at a connected first end of the signal line; and
    a first readout unit configured to detect a signal coming from the signal line and present at the connected first end, to sample the signal present at the connected first end at a second frequency different from the first frequency, and to analyze the sampled signal for the impedance change.

9. The circuit arrangement according to claim 8, further comprising a second signal generation unit, arranged at the first end of the signal line and configured to receive a second signal at the second frequency and apply the received second signal at the second frequency to the readout unit.

10. The circuit arrangement according to claim 9, wherein the second signal generation unit is arranged in a different circuit than the first signal generation unit.

11. The circuit arrangement according to claim 8, wherein the circuit arrangement is configured to detect a signal coming from the signal line, present at the connected first end and having the second frequency and to supply it to the first readout unit.

12. A system, comprising:
    a circuit arrangement including:
        a first signal generation unit configured to input a first signal at a first frequency at a connected first end of a signal line in a communication system, and
        a first readout unit configured to detect a signal coming from the signal line and present at the connected first end, to sample the signal present at the connected first end at a second frequency different from the first frequency, and to analyze the sampled signal for the impedance change; and
    a further circuit arrangement including:
        a second readout unit, which is configured to detect a signal coming from the signal line and present at a connected second end of the signal line and to determine its frequency as the first frequency, and
        a second signal generation unit configured to generate a second signal at the second frequency depending on the first frequency and to input the second signal at the connected second end of the signal line.

13. A computing unit configured to identify impedance changes in a signal line in a communication system, the computing unit configured to:
    input a first signal at a first frequency at a first end of the signal line;
    detect a signal coming from the signal line and present at the first end, sampling the signal at a second frequency different from the first frequency, and analysing the sampled signal for an impedance change; and
    deduce a state of the signal line based on the analyzed signal.

14. A non-transitory machine-readable storage medium on which is stored a computer program for identifying impedance changes in a signal line in a communication system, the computer program, when executed by a computer, causing the computer to perform the following steps:
    inputting a first signal at a first frequency at a first end of the signal line;
    detecting a signal coming from the signal line and present at the first end, sampling the signal at a second frequency different from the first frequency, and analysing the sampled signal for an impedance change; and
    deducing a state of the signal line based on the analyzed signal.

* * * * *